Oct. 9, 1928.
G. B. CHEETHAM
1,686,732
BEARING
Filed Aug. 28, 1926
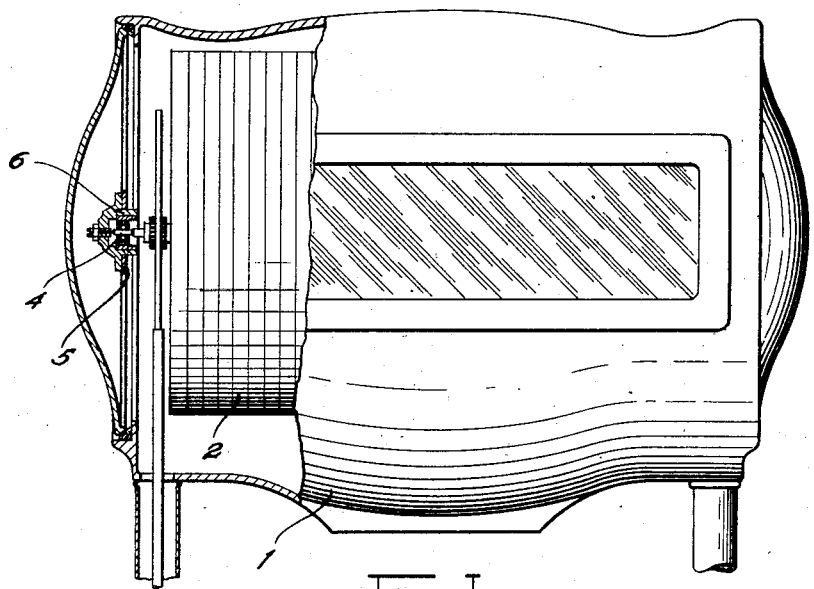
Fig. I.
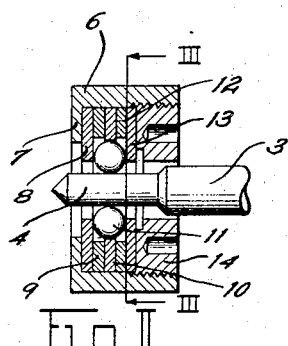
Fig. II.
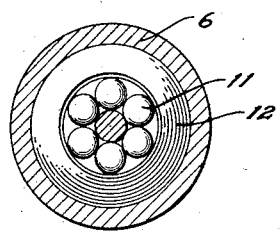
Fig. III.
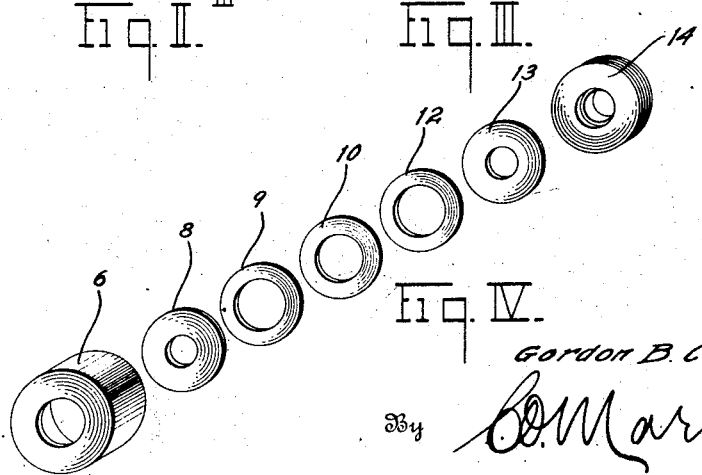
Fig. IV.
Inventor
Gordon B. Cheetham
By B. M. Marshall
Attorney Patented Oct. 9, 1928.

1,686,732

UNITED STATES PATENT OFFICE.

GORDON B. CHEETHAM, OF TOLEDO, OHIO, ASSIGNOR TO TOLEDO SCALE COMPANY, OF TOLEDO, OHIO, A CORPORATION OF NEW JERSEY.

BEARING.

Application filed August 28, 1926. Serial No. 132,052.

This invention relates to bearings, and particularly to ball bearing races designed for light work where it is necessary that the operation be without appreciable friction, and the principal object of the invention is the provision of a bearing of this type which can be economically made with great precision.

Other objects and advantages will be apparent from the following description, in which reference is had to the accompanying drawings illustrating a preferred embodiment of my invention and wherein similar reference numerals designate similar parts throughout the several views.

In the drawings:—

Figure I is a front elevational view of the head of a cylinder scale embodying my invention, parts being broken away and parts shown in section;

Figure II is an enlarged sectional view of a bearing embodying my invention;

Figure III is a sectional view taken substantially on the line III—III of Figure II; and Figure IV is a view in perspective of the parts composing the ball race of my invention.

Referring to the drawings in detail, the chart casing 1 and indicating chart 2 illustrated in Figure I are of well known form. The chart 2 is mounted upon a shaft 3, the end of which is reduced, as at 4, and preferably lapped or polished to provide a smooth bearing surface. The bearing which receives the reduced end 4 of the shaft is mounted on a bracket 5 secured within the casing 2, and consists of a shell 6 and a race and balls assembled therein. The shell 6 is substantially cylindrical in form and one of its ends is partly closed by an integral wall or abutment 7. Lying against the abutment 7 is a washer 8 having a comparatively small opening. Lying against the washer 8 is a washer 9 with a larger opening, and lying against the washer 9 is a washer 10 with an opening larger than that of the washer 8 but smaller than that of washer 9. The opening in the washer 10 is true and polished, as it forms the actual bearing surface upon which the balls 11 roll, but the openings in the washers 8 and 9 need not be made with great precision, since they are not engaged by the balls or the shaft.

Washers 12 and 13 identical with washers 9 and 8 complete the race. All the washers are of the same exterior diameter and they are held in place by means of a plug 14 having a threaded exterior which engages the threaded interior of the shell 6. The washers 8 and 13 serve to retain the balls in place, but they are so lightly engaged that it is not necessary that they be given a high finish in order to prevent friction. The washers 9 and 12 are merely spacers.

It will be seen that the construction I have provided consists of parts which may be produced at a very low cost but nevertheless with all necessary precision. The washers may be punched of inexpensive sheet stock and only the central washer 10 need be given high finish or accuracy. Since the surface of the washer 10 which is trued and finished is cylindrical, it is possible to do the work with economy and precision.

In the arrangement shown the balls will not fall out of place when the bearing is withdrawn from the reduced end 4 of the shaft.

The embodiment of my invention herein shown and described is to be regarded as illustrative only, and it is to be understood that the invention is susceptible to variation, modification and change within the spirit and scope of the subjoined claims.

Having described my invention, I claim:

1. In a device of the class described, in combination, a series of washers coaxially arranged and having openings of different diameters, and bearing balls within the openings of said washers, one of said washers being centrally located and having an opening smaller than the openings of the washers on either side thereof, the bearing balls rolling upon the surface of the opening of the centrally located washer.

2. In a device of the class described, in combination, a group of washers coaxially arranged, the washers at the ends of the group having openings smaller than the intermediate washers, one of the intermediate washers being centrally located and having an opening smaller than the openings of the intermediate washers on either side thereof.

3. In a device of the class described, in combination, a group of washers coaxially arranged, the washers at the ends of the group having openings smaller than the intermediate washers, one of the intermediate washers being centrally located and having an opening smaller than the openings of the intermediate washers on either side thereof, and ball bearings rolling upon the surface of the opening of the centrally located washer and being held in place by the end washers.

4. In a device of the class described, in combination, a shell, a group of washers arranged therein and forming a ball race, and a threaded plug for retaining said washers in place in said shell.

GORDON B. CHEETHAM.